(12) United States Patent
Chen et al.

(10) Patent No.: US 12,141,373 B2
(45) Date of Patent: Nov. 12, 2024

(54) STYLUS PEN WITH ANTENNA (71) Applicant: Huawei Technologies Co., Ltd., Shenzhen (CN)

(72) Inventors: Wenjun Chen, Wuhan (CN); Ning Ma, Shenzhen (CN); Yanbo Li, Wuhan (CN); Kemeng Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/790,627

(22) PCT Filed: Dec. 28, 2020

(86) PCT No.: PCT/CN2020/139848
§ 371 (c)(1),
(2) Date: Jul. 1, 2022

(87) PCT Pub. No.: WO2021/136128
PCT Pub. Date: Jul. 8, 2021

(65) Prior Publication Data
US 2023/0045649 A1 Feb. 9, 2023

(30) Foreign Application Priority Data

Jan. 2, 2020 (CN) .......................... 202010001940.8

(51) Int. Cl.
*G06F 3/0354* (2013.01)
*H01Q 1/22* (2006.01)
(Continued)

(52) U.S. Cl.
CPC ........... *G06F 3/03545* (2013.01); *H01Q 1/22* (2013.01); *H01Q 1/2258* (2013.01); *H01Q 1/44* (2013.01); *H01Q 7/00* (2013.01)

(58) Field of Classification Search
CPC .... G06F 3/03545; H01Q 1/22; H01Q 1/2258; H01Q 1/44; H01Q 7/00
See application file for complete search history.

(56) References Cited

U.S. PATENT DOCUMENTS

| | | | |
|---|---|---|---|
| 6,529,139 B1 * | 3/2003 | Behun .................... | A63H 30/04 340/12.5 |
| 2005/0168389 A1 * | 8/2005 | Yuanzhu ................ | H01Q 13/10 343/770 |

(Continued)

FOREIGN PATENT DOCUMENTS

| CN | 201130359 Y | 10/2008 |
|---|---|---|
| CN | 203178932 U | 9/2013 |

(Continued)

*Primary Examiner* — Patrick N Edouard
*Assistant Examiner* — Joseph P Fox
(74) *Attorney, Agent, or Firm* — Conley Rose, P.C.

(57) ABSTRACT

A stylus pen includes a pen barrel extending along a longitudinal axis, and the pen barrel includes a main body, a pen nib part disposed at one end of the main body, and a pen end part disposed at another end of the main body and that corresponds to the pen nib part; and an antenna disposed on the main body of the pen barrel, where at least one part of the antenna is located outside the pen barrel and is close to the pen nib part and/or the pen end part, and the antenna comprises a loop antenna or a planar inverted-F antenna close to the pen end part.

20 Claims, 11 Drawing Sheets

(51) Int. Cl.
*H01Q 1/44* (2006.01)
*H01Q 7/00* (2006.01)

(56) References Cited

U.S. PATENT DOCUMENTS

| | | | |
|---|---|---|---|
| 2006/0028388 A1* | 2/2006 | Schantz | G01S 3/28 |
| | | | 343/770 |
| 2007/0069397 A1* | 3/2007 | Van Lerberghe | H01Q 7/06 |
| | | | 257/784 |
| 2010/0073247 A1* | 3/2010 | Arkko | H01Q 1/38 |
| | | | 343/745 |
| 2013/0082884 A1* | 4/2013 | Gummalla | H01Q 13/10 |
| | | | 343/702 |
| 2013/0234998 A1 | 9/2013 | Wang et al. | |
| 2014/0029183 A1 | 1/2014 | Ashcraft et al. | |
| 2015/0116291 A1 | 4/2015 | Leung et al. | |
| 2015/0185881 A1 | 7/2015 | Yang et al. | |
| 2017/0010697 A1 | 1/2017 | Jiang et al. | |
| 2017/0110787 A1 | 4/2017 | Ouyang et al. | |
| 2018/0324897 A1* | 11/2018 | Wu | H04W 88/04 |
| 2020/0015701 A1* | 1/2020 | Wei | H01Q 1/50 |
| 2020/0280120 A1* | 9/2020 | Niakan | H01Q 21/28 |

FOREIGN PATENT DOCUMENTS

| | | |
|---|---|---|
| CN | 104750267 A | 7/2015 |
| CN | 106325554 A | 1/2017 |
| CN | 206076482 U | 4/2017 |
| CN | 206411627 U | 8/2017 |
| CN | 209447134 U | 9/2019 |
| CN | 209859110 U | 12/2019 |
| TW | 201337655 A | 9/2013 |

\* cited by examiner

STYLUS PEN WITH ANTENNA

This application claims priority to Chinese Patent Application No. 202010001940.8, filed on Jan. 2, 2020 and entitled "STYLUS PEN WITH ANTENNA", which is incorporated herein by reference in its entirety.

TECHNICAL FIELD

This application relates to the field of wireless communication, and in particular, to a stylus pen with an antenna.

BACKGROUND

As one of important accessories of a tablet computer and a mobile phone, a stylus pen is used in increasingly more scenarios. Because a size of the stylus pen is small, and more functions are integrated, antenna layout space is very limited. How to design an antenna by using an existing metallic component of the stylus pen, to reduce space occupied by the antenna, reduce impact of hand holding, and meet a performance requirement is a difficult point in an antenna design process of the stylus pen.

SUMMARY

Embodiments of this application provide a stylus pen with an antenna, so that the antenna can be designed by using an existing metallic component of the stylus pen, to reduce space occupied by the antenna.

According to a first aspect, an embodiment of this application discloses a stylus pen, including:

a pen barrel, where the pen barrel extends along a longitudinal axis, and the pen barrel includes a main body, a pen nib part disposed at one end of the main body, and a pen end part that is disposed at another end of the main body and that corresponds to the pen nib part; and an antenna, where the antenna is disposed on the main body of the pen barrel, and at least one part of the antenna is located outside the pen barrel and is close to the pen nib part and/or the pen end part.

In a possible implementation of the first aspect, the antenna includes a loop antenna close to the pen end part.

In a possible implementation of the first aspect, the antenna includes a planar inverted-F antenna close to the pen end part.

In a possible implementation of the first aspect, the antenna includes a metallic radiator and a feed port.

The metallic radiator is located outside the pen barrel, the feed port is located inside the pen barrel, and the metallic radiator is connected to the feed port via a through hole on the main body of the pen barrel.

In a possible implementation of the first aspect, the main body of the pen barrel includes a metallic tube extending along the longitudinal axis, and a part, opposite to the metallic radiator, of the metallic tube has an opening. The opening is disposed on the metallic tube, to significantly improve performance of the antenna.

In a possible implementation of the first aspect, the opening is filled with plastic or glass.

In a possible implementation of the first aspect, the antenna includes a metallic pen clip close to the pen end part. The pen clip is disposed as the antenna, to save space occupied when the antenna is disposed inside the pen barrel in the conventional technology.

In a possible implementation of the first aspect, a part, that is located outside the pen barrel, of the pen clip is coated with a plastic layer.

In a possible implementation of the first aspect, the main body of the pen barrel includes a metallic tube extending along the longitudinal axis, and the antenna further includes a slot antenna that is disposed on the metallic tube and that is close to the pen nib part. In a normal handwriting mode, a hand is close to the pen nib part. In this case, the antenna close to the pen end part is in a working state. When the hand holds the pen end part for sketching, the antenna close to the pen end part is switched to the slot antenna close to the pen nib part, and the slot antenna close to the pen nib part is switched to a working state.

Disposing of dual antennas can ensure that antenna performance of the stylus pen is not affected in different use cases. For example, the antenna performance is not affected in a normal handwriting case or when the hand holds the pen end part for sketching.

In a possible implementation of the first aspect, the antenna is a Bluetooth antenna.

According to a second aspect, an embodiment of this application discloses a stylus pen, including:

a pen barrel, where the pen barrel includes a main body, a pen nib part disposed at one end of the main body, and a pen end part that is disposed at another end of the main body and that corresponds to the pen nib part, and the main body includes a metallic tube extending along a longitudinal axis; and an antenna, where the antenna includes at least one slot antenna disposed on the metallic tube of the main body. The slot antenna is disposed on the metallic tube of the pen barrel, to save space occupied when the antenna is disposed inside the pen barrel in the conventional technology.

In a possible implementation of the second aspect, the slot antenna is close to the pen nib part or the pen end part of the pen barrel.

In a possible implementation of the second aspect, the antenna includes a first slot antenna close to the pen nib part of the pen barrel and a second slot antenna close to the pen end part. In a normal handwriting mode, a hand is close to the pen nib part. In this case, the slot antenna close to the pen end part is in a working state. When the hand holds the pen end part for sketching, the slot antenna close to the pen end part is switched to the slot antenna close to the pen nib part, and the slot antenna close to the pen nib part is switched to a working state.

Disposing of dual antennas can ensure that antenna performance of the stylus pen is not affected in different use cases. For example, the antenna performance is not affected in a normal handwriting case or when the hand holds the pen end part for sketching.

In a possible implementation of the second aspect, the first slot antenna and the second slot antenna are switched by using a transmit antenna selection system.

In a possible implementation of the second aspect, the antenna is a Bluetooth antenna, and a slot length of the slot antenna is 40% to 60% of a wavelength of a Bluetooth signal transmitted by the slot antenna.

In a possible implementation of the second aspect, a shape of the slot antenna is a curve.

In a possible implementation of the second aspect, the slot antenna is U-shaped, Z-shaped, or helical.

In a possible implementation of the second aspect, the main body further includes a plastic tube extending along the longitudinal axis, and the plastic tube sleeves the metallic tube.

DESCRIPTION OF EMBODIMENTS

Descriptive embodiments of this application include but are not limited to an authentication method, a medium thereof, and an electronic device.

The following describes the technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

Figure 1:
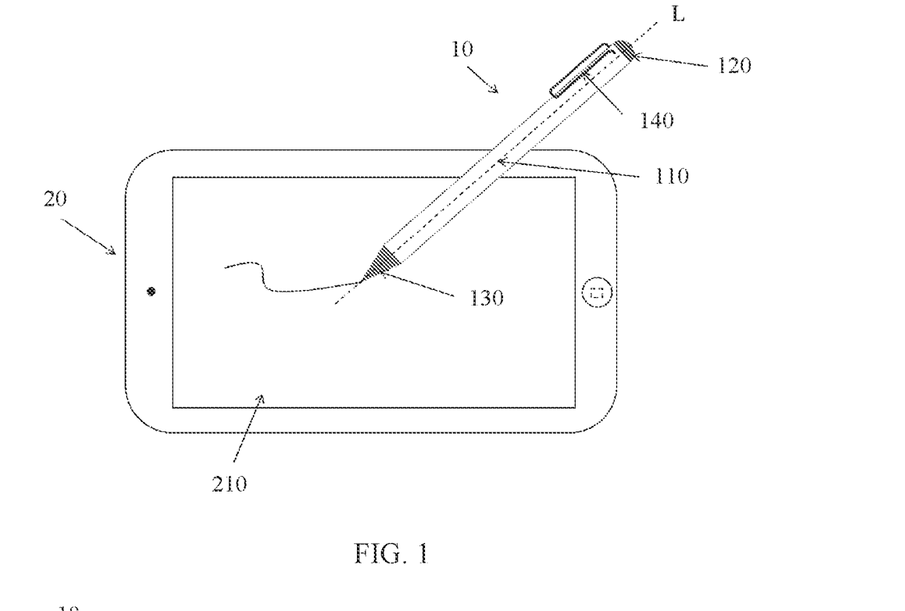
FIG. 1 is a diagram of a scenario in which a stylus pen interacts with an electronic device according to some embodiments of this application.

According to some embodiments of this application, FIG. 1 is a diagram of a scenario in which a stylus pen interacts with an electronic device. As shown in FIG. 1, an electronic device may be any electronic device that can interact with a stylus pen 10, for example, an electronic device, for example, a laptop computer, a tablet computer, a smartphone, a media player, a wearable device, a head mounted display, a mobile email device, a portable game console, a portable music player, a reader device, a personal digital assistant, a virtual reality or augmented reality device, or a television into or to which one or more processors are embedded or coupled.

In the following descriptions, an example in which the electronic device 20 is a tablet computer is used for description.

As shown in FIG. 1, the tablet computer 20 has a display 210, and the stylus pen 10 may provide input information for the display 210 through contact with the display 210, or interact with the display 210 by using a wireless communication technology. For example, the stylus pen 10 is used to write and draw on the display 210, and tap a function icon on the display.

In some embodiments, the stylus pen 10 may include a main body 110, a pen end part 120, a pen end part 130, an antenna 140, a battery, and a circuit (not shown). The main body 110 extends along a longitudinal axis L. The main body 110 may be a hollow tube that is in a shape of a cylinder or in any other shape. For example, a cross section of the hollow tube is a square, a hexagon, an octagon, or an irregular polygon. Although the main body 110 in the accompanying drawings described in the following embodiments is shown in the shape of the cylinder, it may be understood that the shape of the cylinder is merely an example, and the main body 110 may be alternatively in another shape mentioned above, provided that the main body 110 is a hollow tube.

In addition, the main body 110 may include a metallic tube, or may include a non-metallic tube. For example, the non-metallic tube may be a plastic tube or a ceramic tube. In some embodiments, the main body 110 may have only one metallic tube. For example, the main body 110 may be a metallic tube formed by bonding a plurality of metallic structures through point soldering, a screw, a conductive fabric, or a conductive adhesive. In some other embodiments, the main body 110 includes a metallic tube and a plastic tube sleeving the metallic tube. In some other embodiments, the main body 110 includes a metallic tube and a plastic tube nested inside the metallic tube. In some other embodiments, the main body 110 includes a metallic tube and plastic tubes nested inside and sleeving the metallic tube. The plastic tube may be alternatively made of another material, for example, may be a ceramic tube. It may be understood that, in this application, the antenna 140 and the metallic tube of the main body 110 may be made of aluminum, copper, an aluminum alloy, a magnesium alloy, a stainless steel material, or the like.

The pen nib part 130 of the stylus pen 10 is disposed at one end of the main body 110. In some embodiments, a conductive elastic component may be disposed on the pen nib part 130, and the conductive elastic component may be detected by a capacitive touch sensor on the display 210 of the tablet computer 20. In some embodiments, an active electronic component may be disposed on the pen nib part 130, and a signal generated by the active electronic component can be detected by the capacitive touch sensor on the display 210 of the tablet computer 20. In some embodiments, the pen nib part 130 may further include a force sensor, and the force sensor may be configured to measure magnitude of force with which a user presses the stylus pen 10. It may be understood that another component may be further disposed on the pen nib part 130. This is not limited herein.

The pen end part 120 is disposed at another end, that corresponds to the pen nib part 130, of the main body 110 of the stylus pen 10. In some embodiments, the pen end part 120 may also include at least one of a conductive elastic component, an active electronic component, and a force sensor. In some embodiments, the pen end part 120 may further include a button and an input/output component. For example, the input/output component is a USB interface, and is configured to charge the stylus pen 10. In some embodiments, a detachable cap may be further disposed on the pen end part 120.

The battery is configured to supply power to the stylus pen 10. For example, in some embodiments, the battery may be charged through the USB interface.

The circuit may include a control circuit, a radio frequency circuit, and the like. These circuits may be integrated into a hardware entity (for example, a chip or a PCB (Printed Circuit Board, PCB)), or may be independent hardware entities. The control circuit may be configured to run software related to the stylus pen 10, to process a signal received by the stylus pen 10 or generate a signal that needs to be output by the stylus pen 10. The control circuit may further communicate with another circuit in the stylus pen 10, for example, communicate with the another circuit by using Bluetooth or NFC (Near Field Communication, NFC). The radio frequency circuit may be configured to implement wireless communication between the stylus pen 10 and an external device. The radio frequency circuit may be connected to the antenna 140, to receive a radio signal, for example, a Bluetooth signal, received by the antenna 140, or send, to the antenna 140, a radio signal, for example, a Bluetooth signal, that needs to be transmitted through the antenna 140.

The following uses an example in which the antenna of the stylus pen 10 is a Bluetooth antenna for description. It may be understood that an antenna structure in this application is also applicable to an antenna of another wireless communication type. This is not limited herein.

The antenna 140 of the stylus pen 10 may be implemented in various manners. For example, the antenna 140 is partially or completely disposed outside the main body 110 of a pen barrel, or the antenna 140 is disposed on the metallic tube of the main body 110, and is implemented in a form of a slot antenna.

Pen Clip Antenna

Figure 2A:
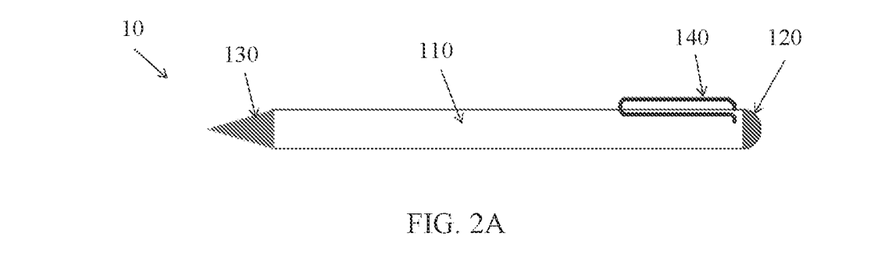
FIG. 2A is a schematic diagram of a structure of a stylus pen with a pen clip antenna according to some embodiments of this application.

According to an embodiment of this application, FIG. 1 and FIG. 2A show a stylus pen 10 with a pen clip antenna 140. Specifically, the antenna 140 is a loop (Loop) antenna, and is disposed on the main body 110 in a form of a pen clip (also referred to as a pen clip antenna below) of the stylus pen 10.

Figure 2B:
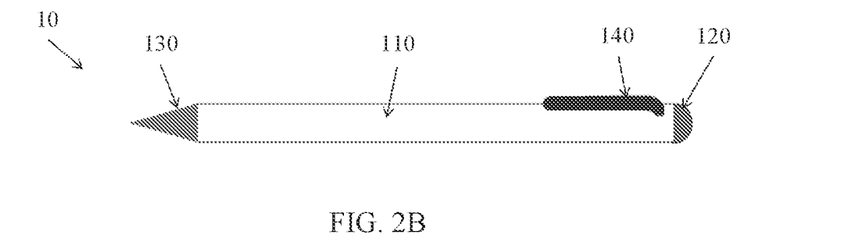
FIG. 2B is a schematic diagram of a structure of a stylus pen with a pen clip antenna according to some embodiments of this application.

FIG. 2B shows another stylus pen 10 with a pen clip antenna 140. Specifically, the antenna 140 of the stylus pen 10 is a planar inverted-F antenna (planar inverted-F antenna, PIFA), and is disposed on the main body 110 in a form of a pen clip (also referred to as a pen clip antenna below).

It may be understood that the pen clip antenna 140 shown in FIG. 2A and FIG. 2B may include a metallic radiator located outside the pen barrel and a feed port located inside the pen barrel. The metallic radiator passes through a through hole on the main body 110 and is connected to the feed port. For example, in some embodiments, the control circuit of the stylus pen 10 is a PCB mamboard, and the PCB mainboard is located near the antenna. A metallic part, that is bent to the inside of the pen barrel, of the pen clip antenna may be directly elastically connected to an elastic sheet of the PCB mainboard, and then connected to the radio frequency chip through a microstrip. In some embodiments, the PCB mainboard is far away from the antenna. The feed port (metallic part), that is bent to the inside of the pen barrel, of the pen clip antenna is elastically connected to a sub-board by using an elastic sheet, and then is connected to the PCB mainboard through a cable (radio frequency coaxial cable) or a liquid crystal polymer (Liquid-crystal polymer, LCP)/ modified polyimide (Modified Polyimide, MPI) cable. In some embodiments, the PCB mainboard is far away from the antenna. The feed port (metallic part), that is bent to the inside of the pen barrel, of the pen clip antenna is directly connected to a cable or an LCP/MPI cable by using a point soldering process, a screw, or the like. Another end of the cable or the LCP/MPI cable is connected to the PCB mainboard.

In addition, it may be understood that, in another embodiment, the metallic radiator may also extend into the main body 110, and be connected to a circuit board or a chip inside the main body 110 by using the feed port. Alternatively; both the metallic radiator and the feed port are located outside the pen barrel, and the coaxial cable or the cable is connected to the feed port outside the pen barrel and then connected to a circuit inside the pen barrel.

In addition, it may be understood that a shape of the pen clip antenna 140 is not limited to the shapes shown in FIG. 2A and FIG. 2B. For example, the pen clip may be in a shape of a circle, an ellipse, a wave, a polygon, or a cartoon character.

In addition, it may be understood that, although the pen clip antenna 140 shown in FIG. 2A and FIG. 2B is a loop antenna or a PIFA type antenna, in another embodiment, the pen clip antenna 140 may be alternatively another type of antenna, for example, a monopole antenna, an IFA antenna, or a patch antenna (patch antenna).

Figure 3:
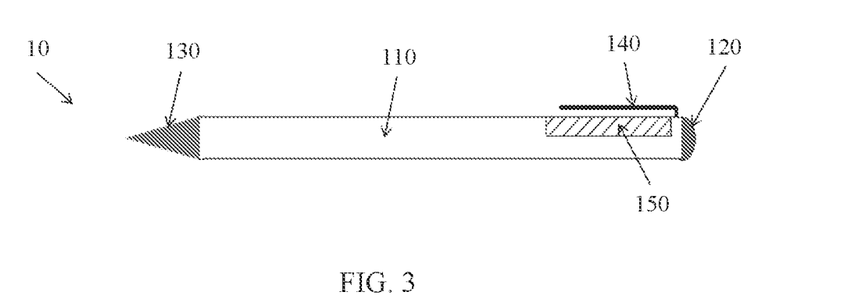
FIG. 3 is a schematic diagram of a structure of a stylus pen with an opening disposed below a pen clip antenna according to some embodiments of this application.

In addition, in some embodiments, to improve antenna performance, as shown in FIG. 3, an opening 150 is disposed on a part that is on the main body 110 and that corresponds to the pen nib antenna 140. The opening 150 may be filled with a non-metallic material, for example, filled with plastic or a glass fiber, to ensure structural strength of the entire stylus pen 10.

Figure 4A:
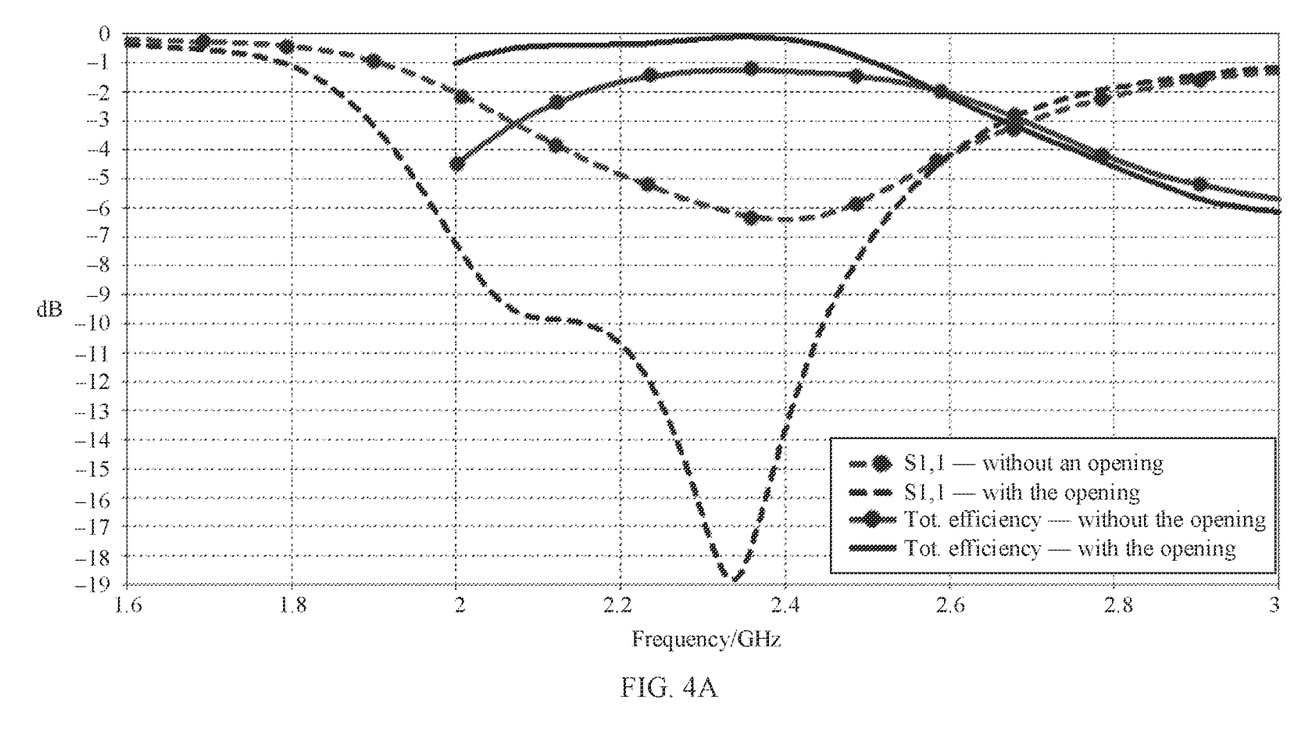
FIG. 4A shows simulation curves of antenna performance of the stylus pen shown in FIG. 2A when an opening is disposed below the pen clip antenna and when no opening is disposed below the pen clip antenna according to some embodiments of this application.
Figure 4B:
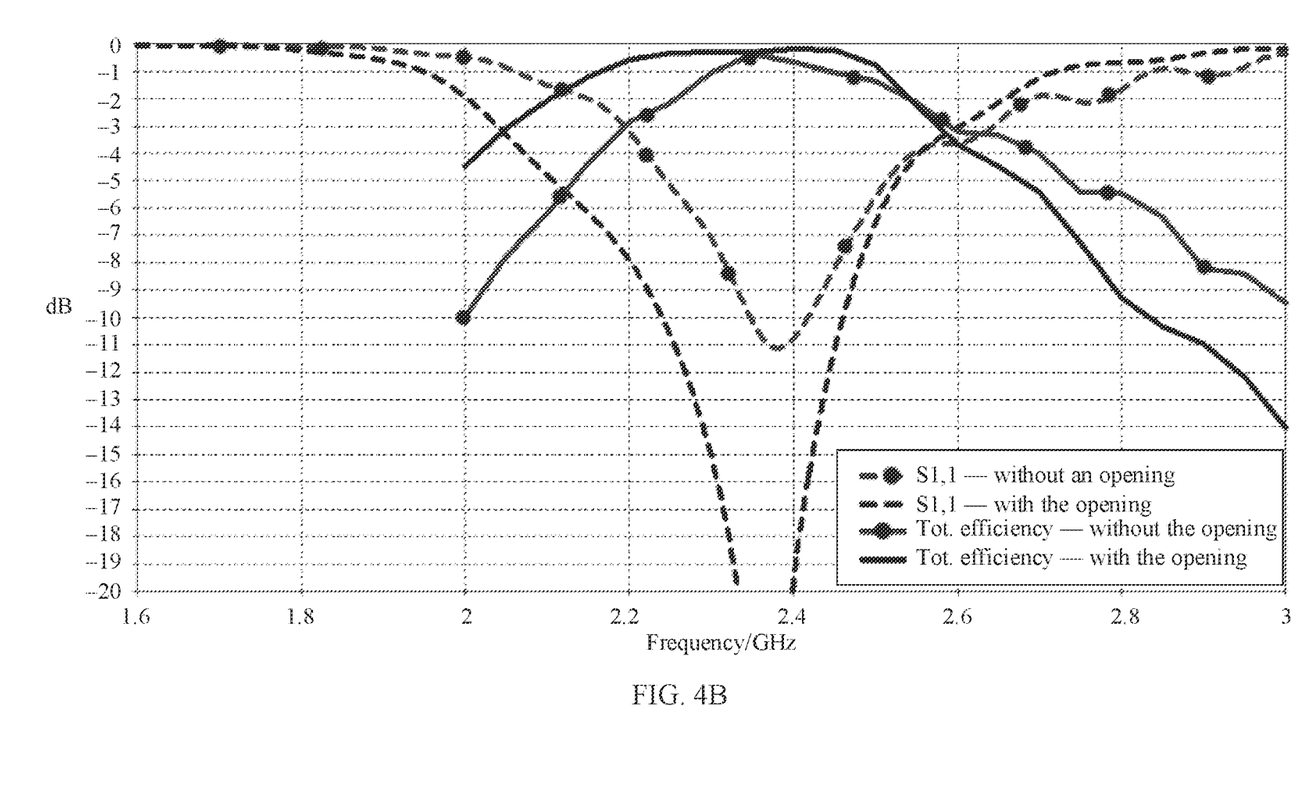
FIG. 4B shows simulation curves of antenna performance of the stylus pen shown in FIG. 2B when an opening is disposed below the pen clip antenna and when no opening is disposed below the pen clip antenna according to some embodiments of this application.

With reference to FIG. 4A and FIG. 4B, the following specifically describes performance of the pen clip antenna 140 when the stylus pen 10 shown in FIG. 2A and FIG. 2B is provided with an opening and when the stylus pen 10 shown in FIG. 2A and FIG. 2B is provided with no opening.

FIG. 4A is a diagram of performance simulation curves of a return loss parameter S11 and total efficiency (Tot. Efficiency) of the loop pen clip antenna 140 when the stylus pen 10 shown in FIG. 2A is provided with the opening 150 and when the stylus pen 10 shown in FIG. 2A is provided with no opening 150. Simulation software is three-dimensional electromagnetic field simulation software CST, and a simulation result is obtained through calculation by using a time domain solver.

Specifically, in FIG. 4A, a horizontal coordinate represents a frequency in a unit of GHz, and a vertical coordinate represents magnitude values of S11 (namely, S11 shown in the figure, where S11 is also used to represent the parameter S11 in the following accompanying drawings) and the total efficiency in a unit of dB. Within an operating band range from 2.4 GHz to 2.5 GHz, the total efficiency of the loop pen clip antenna 140 after the opening 150 is disposed is approximately 1 dB higher than the total efficiency of the loop pen clip antenna 140 when no opening 150 is disposed, and a bandwidth (S11<−5 dB) of the loop pen clip antenna 140 after the opening 150 is disposed is more than 60% higher than a bandwidth of the loop pen clip antenna 140 when no opening is disposed. It is indicated that antenna performance of the loop pen clip antenna 140 is significantly improved after the opening 150 is disposed.

FIG. 4B shows a diagram of performance simulation curves of a return loss parameter S11 and total efficiency (System Tot. Efficiency) of the pen clip antenna 140 when the stylus pen 10 shown in FIG. 2B is provided with the opening and when the stylus pen 10 shown in FIG. 2B is provided with no opening. Simulation software is three-dimensional electromagnetic field simulation software CST, and a simulation result is obtained through calculation by using a time domain solver.

Specifically, in FIG. 4B, a horizontal coordinate represents a frequency in a unit of GHz, and a vertical coordinate represents magnitude values of S11 and the total efficiency in a unit of dB. Within an operating band range from 2.4 GHz to 2.5 GHz, the total efficiency of the PIFA type pen clip antenna 140 after the opening 150 is disposed is approximately the same as peak efficiency of the PIFA type pen clip antenna 140 when no opening 150 is disposed, but a bandwidth (S11<−5 dB) of the PIFA type pen clip antenna 140 after the opening 150 is disposed is improved by more than 30% compared with a bandwidth of the PIFA type pen clip antenna 140 when no opening 150 is disposed. It is indicated that antenna performance of the PIFA type pen clip antenna 140 after the opening 150 is disposed is improved.

In conclusion, the performance of the pen clip antenna 140 can be improved through disposing the opening on the main body of the stylus pen 10.

Figure 5:
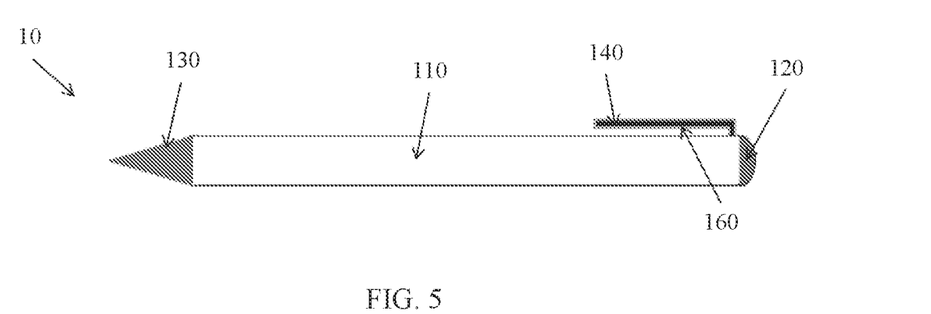
FIG. 5 is a schematic diagram of a structure of a stylus pen with a pen clip antenna on which an insulation material film is disposed according to some embodiments of this application.

In addition, in some embodiments, as shown in FIG. 5, to reduce impact of the hand of the user on the antenna 140 during use, the antenna 140 is coated with a layer of insulation material. For example, the antenna 140 is coated with a layer of plastic material by using a metal coating process.

In addition, it may be understood that, although the antenna 140 described in the foregoing accompanying drawings is disposed outside the main body 110 of the pen barrel in a form of the pen clip, in another embodiment, an antenna 140 in another shape may be alternatively disposed, and is not necessarily used as the pen clip. For example, the antenna 140 is partially or completely disposed only outside the pen barrel, and is close to the pen end part 120 or close to the pen clip part 130.

In the foregoing embodiment, the metallic tube, the plastic tube, and the like of the main body 110 of the stylus pen 10 may be integrated, to improve the structural strength of the stylus pen 10. Alternatively, the metallic tube, the plastic tube, and the like of the main body 110 of the stylus pen 10 may be segmented, and are integrally electrically connected by using a method, for example, a point soldering process, a screw, a conductive fabric, or a conductive adhesive. This is not limited herein.

Slot Antenna

As described above, the antenna that can be used for the stylus pen 10 may be alternatively a slot antenna disposed on the metallic tube of the main body 110 of the stylus pen 10. In this application, to reduce a possibility that the slot antenna is blocked by the hand during use, the slot antenna is disposed close to the pen end part 120 or the pen nib part 130, and to reduce a length of the slot antenna along the longitudinal axis as much as possible, the slot antenna is disposed as a curve around the metallic tube. In addition, in some embodiments, the metallic tube may be divided into a plurality of segments, which are integrally electrically connected by using a method, for example, point soldering, a screw, a conductive fabric, or a conductive adhesive. Alternatively, the metallic tube may be integrated. In some embodiments, a plastic tube may be also disposed at an outermost layer of the metallic tube as a case, so that the slot antenna does not affect an appearance of a product.

Figure 6A:
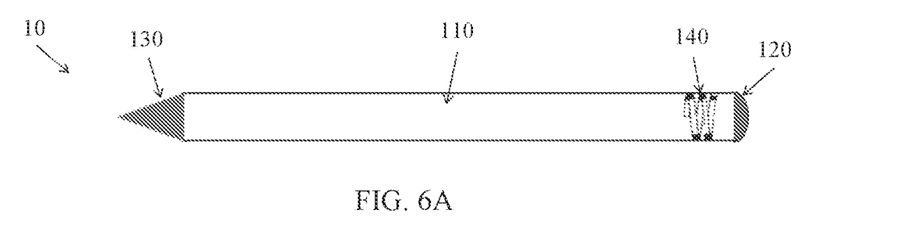
FIG. 6A to FIG. 6C are schematic diagrams of structures of stylus pens with slot antennas in different shapes according to some embodiments of this application.
Figure 6B:
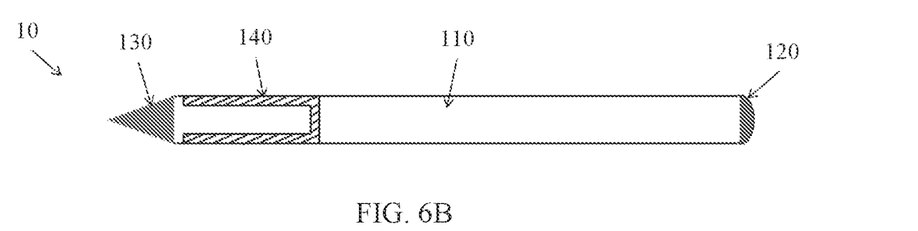
Figure 6C:
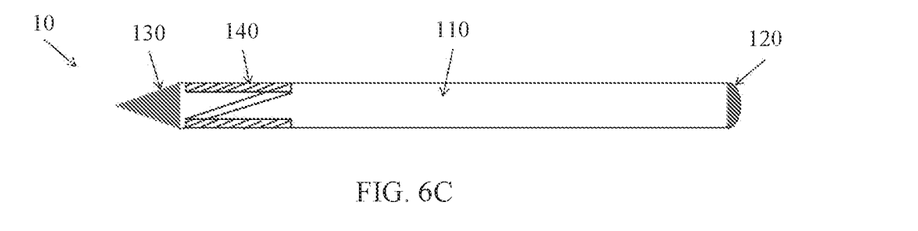

According to some embodiments of this application. FIG. 6A to FIG. 6C show stylus pens 10 with slot antennas 140 in different shapes. FIG. 6A shows a helical slot antenna, FIG. 6B shows a U-shaped slot antenna, and FIG. 6C shows a Z-shaped slot antenna.

It may be understood that the shape of the slot antenna 140 is not limited to the three shapes in FIG. 6A to FIG. 6C, and may be any curvilinear shape. For example, the shape may be an S shape or a wavy shape.

The slot antenna 140 may feed through coupling, or may feed directly. A slot antenna above a PCB may feed by directly using an elastic sheet. When the slot antenna is far away from the PCB, a cable or an LCP/MPI cable may be used to transmit a radio frequency signal, and the antenna and a radio frequency cable are connected by using a screw or through point soldering.

Figure 7A:
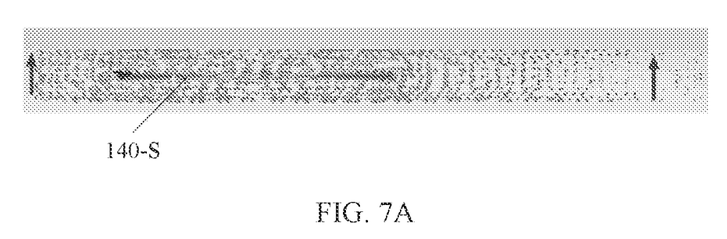
FIG. 7A and FIG. 7B respectively show current distributions on a metallic tube of a main body 110 of a stylus pen 10 when a slot antenna is linear (where a current region is 140-S) and U-shaped (where a current region is 140-U) according to some embodiments of this application.
Figure 7B:
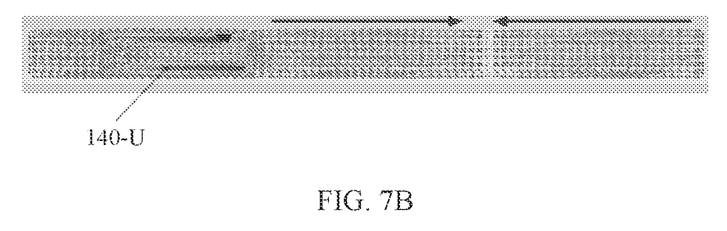

In addition, it may be understood that, to enable the slot antenna to effectively support a Bluetooth resonance mode, a length of the slot antenna needs to be set to be close to a ½ wavelength (approximately 60 mm) of Bluetooth. Generally, the stylus pen has a diameter of 8 mm to 9 mm and a length of more than 120 mm. FIG. 7A and FIG. 7B respectively show current distributions on the metallic tube of the main body 110 of the stylus pen 10 when the slot antenna is linear (where a current region is 140-S) and when the slot antenna is U-shaped (where a current region is 140-U). As shown in FIG. 7A, when the slot antenna is linear, a longitudinal current of the pen barrel is excited. Because a width (8 mm to 9 mm) of the pen barrel is far less than a λ/2 wavelength of Bluetooth, the Bluetooth resonance mode cannot be effectively supported. When the slot antenna is U-shaped, a transverse current of the pen barrel is excited. Because a length of the pen barrel is usually above 120 mm, which is greater than a λ/2 wavelength (approximately 60 mm) of Bluetooth, better antenna performance may be obtained. Therefore, in this application, the slot antenna is disposed in the curvilinear shape on the metallic tube of the main body 110 of the stylus pen 10, and an overall length of the slot antenna is 40% to 60% of a Bluetooth wavelength, to obtain better Bluetooth antenna performance, reduce a length of the slot antenna in a direction of the longitudinal axis, and reduce a possibility that the hand holds the slot antenna during use.

Figure 8:
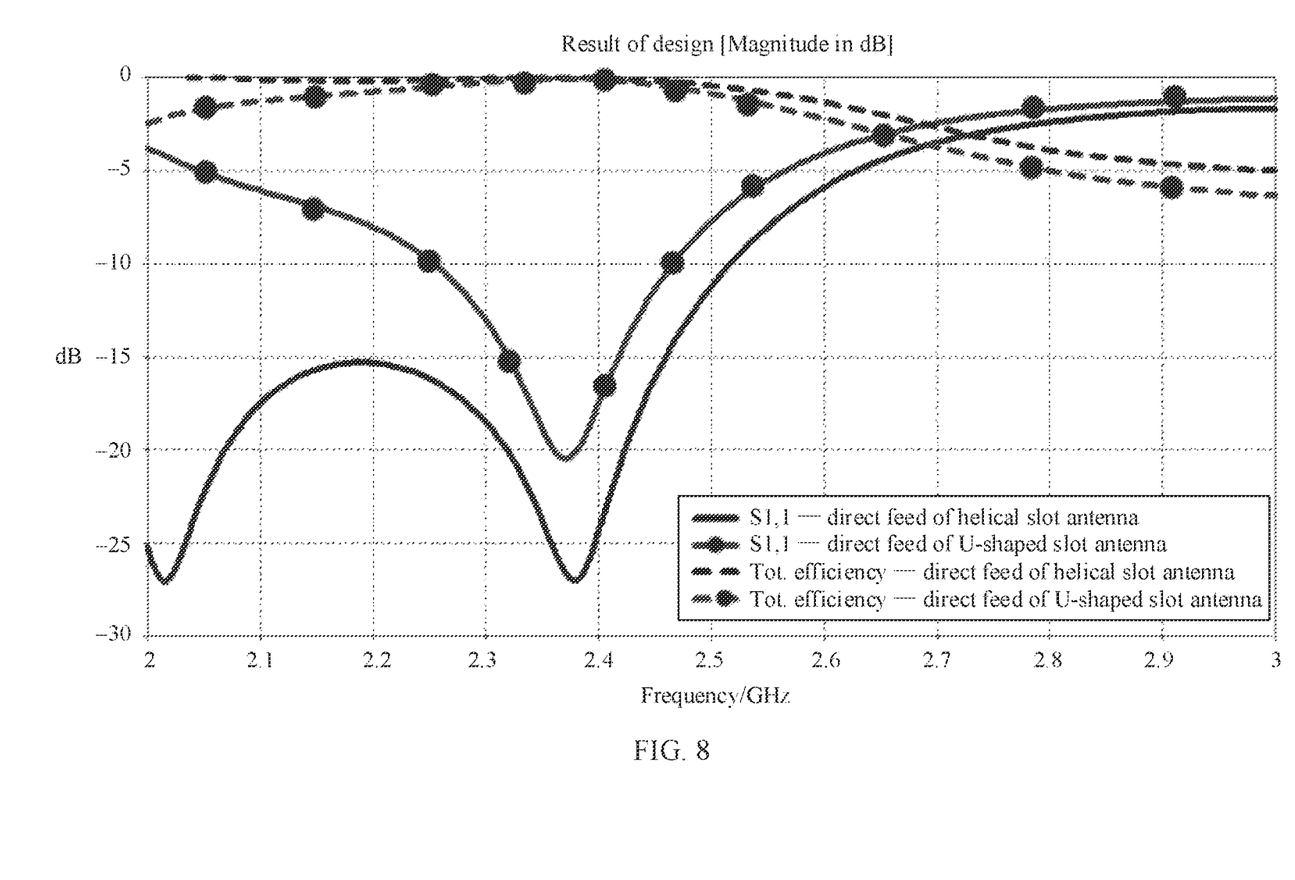
FIG. 8 is a diagram of simulation performance curves of a helical slot antenna shown in FIG. 6A and a U-shaped slot antenna shown in FIG. 6B according to some embodiments of this application.

The following specifically describes performance of the helical slot antenna shown in FIG. 6A and the U-shaped slot antenna shown in FIG. 6B with reference to FIG. 8.

FIG. 8 shows a diagram of performance simulation curves of a return loss S11 and total efficiency (Tot. Efficiency) of the helical slot antenna shown in FIG. 6A and the U-shaped slot antenna shown in FIG. 6B in a case of direct feed. Software used in a simulation test is three-dimensional electromagnetic field simulation software CST, and a simulation result is obtained through calculation by using a time domain solver.

Specifically, in FIG. 8, a horizontal coordinate represents a frequency in a unit of GHz, and a vertical coordinate represents magnitude values of S11 and the total efficiency in a unit of dB. Within an operating band range from 2.4 GHz to 2.5 GHz, total efficiency values of the helical slot antenna and the U-shaped slot antenna are close. When the slot antenna uses center feed, a matching component needs to be used for tuning. When the slot antenna uses side feed, an appropriate feed position is selected (where a feed point is approximately 5 mm to 7 mm away from a tail end), to obtain resonance without a matching component. It can be seen from S11 that, when feed is performed at a position that is ⅓ of the helical antenna, double resonance can be obtained, and the helical antenna has wider bandwidth compared with a bandwidth of the U-shaped antenna.

Dual Antennas

When the stylus pen 10 is used, the user may write in a normal writing posture (that is, the user holds the stylus pen close to the pen nib part 130, which is referred to as a handwriting mode below), or may hold the pen end part 120 to perform an operation, for example, sketching (which is referred to as an air mouse mode below). In the handwriting mode, if the antenna 140 is disposed close to the pen nib part 130, antenna performance may be affected because the hand holds the antenna. However, in the air mouse mode, if the antenna 140 is disposed close to the pen end part 120, the hand generally holds the pen end part, and antenna performance may be also affected.

Figure 10A:
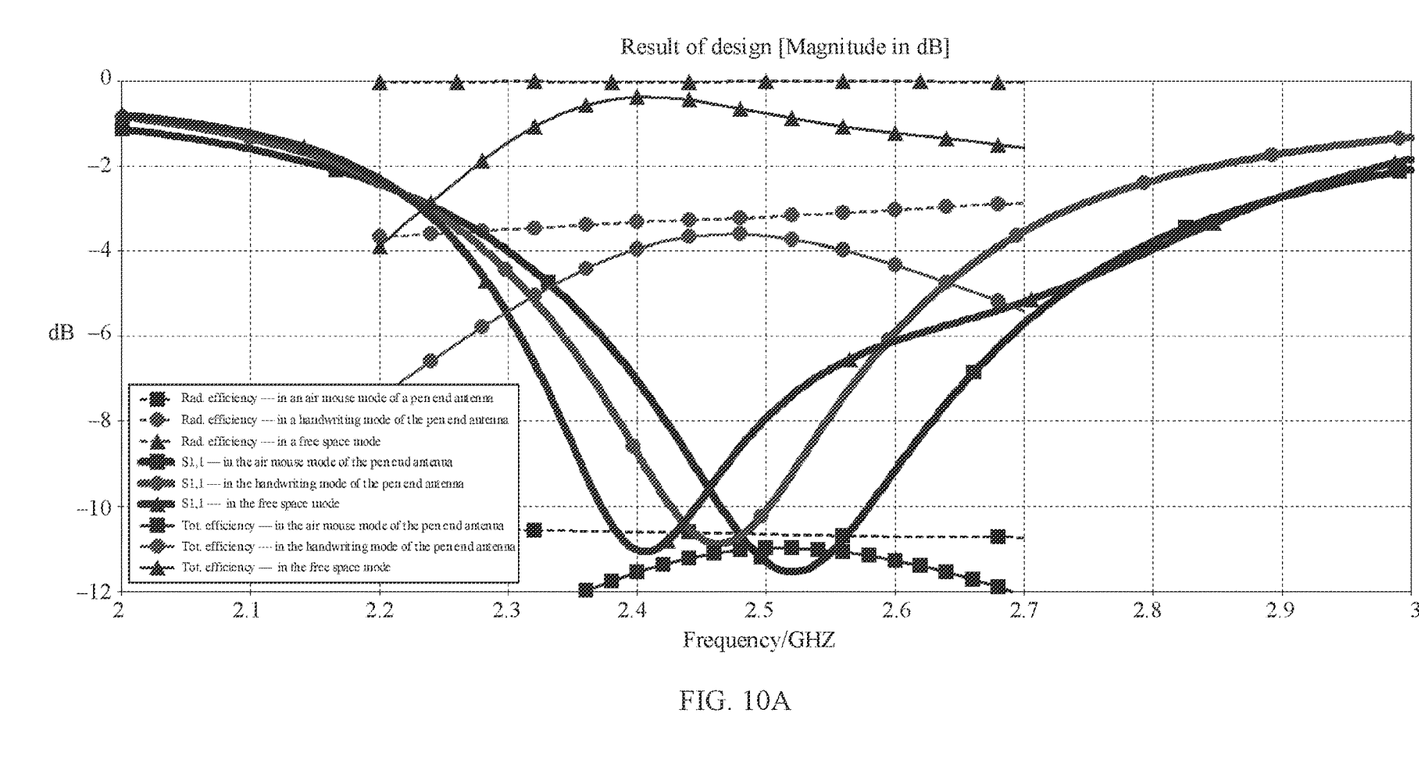
FIG. 10A and FIG. 10B is a diagram of simulation performance curves of a U-shaped slot antenna in two scenarios, namely a writing mode and an air mouse mode, when the U-shaped slot antenna is separately disposed close to a pen end part and close to a pen nib part according to some embodiments of this application.
Figure 10B:
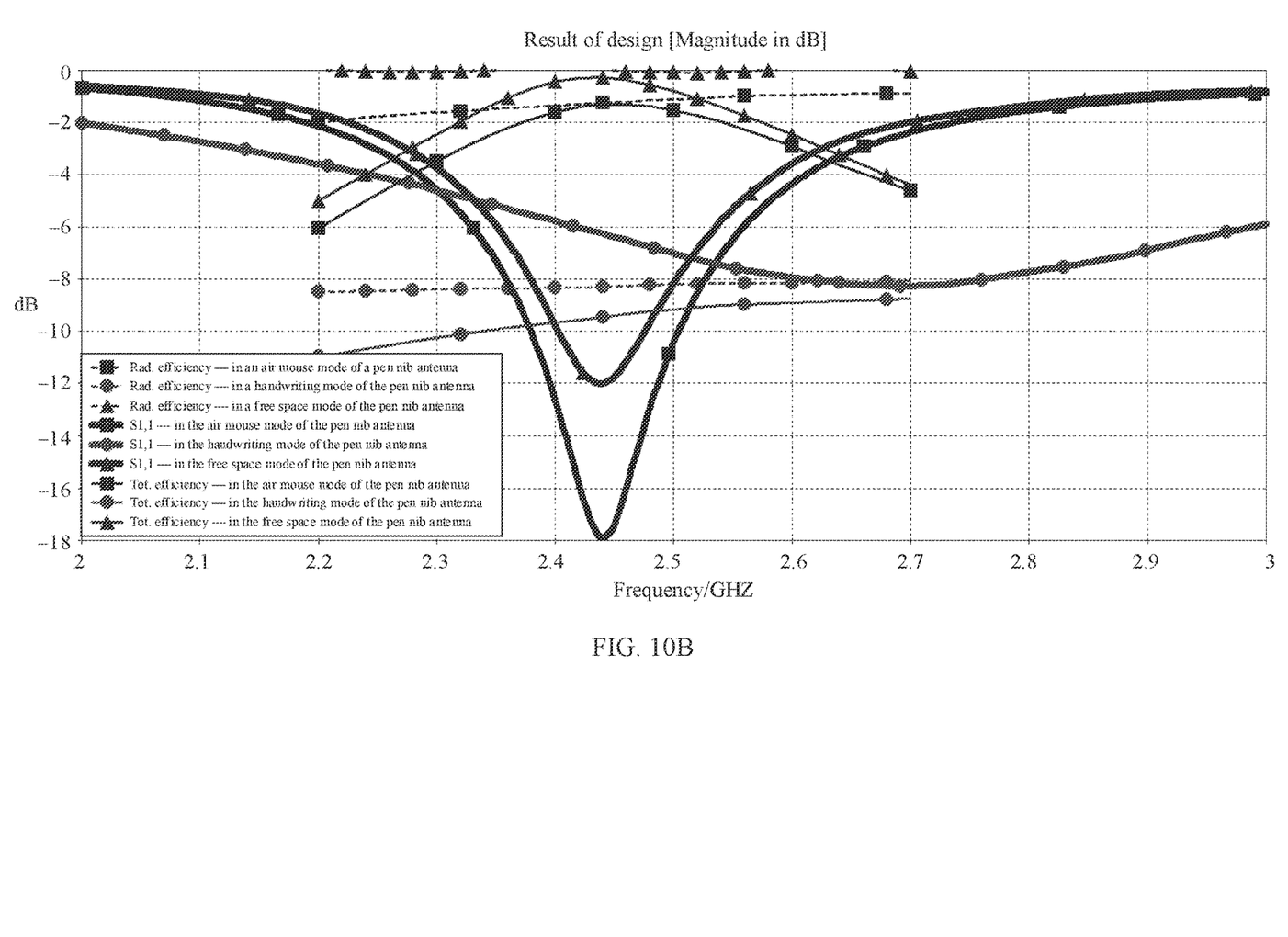

With reference to FIG. 10A and FIG. 10B, the following describes performance of the U-shaped slot antenna 140 in each writing mode when the U-shaped slot antenna 140 is disposed close to the pen end part 120 and when the U-shaped slot antenna 140 is disposed close to the pen nib part 130.

FIG. 10A is a diagram of performance simulation curves of a return loss parameter S11, total efficiency (Tot. Efficiency), and radiation efficiency (Rad. Efficiency) of the U-shaped slot antenna 140 when the stylus pen 10 is in the handwriting mode, the air mouse mode, and a free space mode and when the U-shaped slot antenna 140 is disposed close to the pen end part 120 (referred to as a pen end antenna below). The handwriting mode means that a position held by the user during use is close to the pen nib part 130 of the stylus pen 10. The air mouse mode means that a position held by the user during use is close to the pen end part 120 of the stylus pen 10. The free space mode refers to a test performed when the stylus pen is not used. Simulation software is three-dimensional electromagnetic field software CST, and a simulation result is obtained through calculation by using a time domain solver.

Specifically, in FIG. 10A, a horizontal coordinate represents a frequency in a unit of GHz, and a vertical coordinate represents magnitude values of S11, the total efficiency, and radiation efficiency in a unit of dB. As shown in FIG. 10A, within an operating band range from 2.4 GHz to 2.5 GHz, magnitude of S11 in the three modes is basically the same. However, due to an absorption effect of a human body on an electromagnetic wave, the radiation efficiency of the U-shaped slot antenna 140 in the air mouse mode of the pen end antenna is approximately 10.5 dB lower than radiation efficiency of the antenna 140 in the free space mode of the pen end antenna. The total efficiency of the U-shaped slot antenna 140 in the air mouse mode of the pen end antenna is approximately 10.1 dB lower than the total efficiency of the antenna 140 in the free space mode of the pen end antenna. The radiation efficiency of the U-shaped slot antenna 140 in the handwriting mode of the pen end antenna is only approximately 3.5 dB lower than the radiation efficiency of the antenna 140 in the free space mode of the pen end antenna. The total efficiency of the U-shaped slot antenna 140 in the handwriting mode of the pen end antenna is approximately 3.5 dB lower than the total efficiency of the antenna 140 in the free space mode of the pen end antenna. It can be learned that, for the U-shaped slot antenna 140 disposed close to the pen end part 120, the total efficiency and the radiation efficiency of the antenna are reduced in the air mouse mode of the pen end antenna, and antenna performance is reduced.

FIG. 10B shows a diagram of performance simulation curves of a return loss parameter S11, total efficiency (Tot. Efficiency), and radiation efficiency (Rad. Efficiency) of the U-shaped slot antenna 140 when the stylus pen 10 is in the handwriting mode, the air mouse mode, and a free space mode and when the U-shaped slot antenna 140 is disposed close to the pen nib part 130 (referred to as a pen nib antenna below). Simulation software is three-dimensional electromagnetic field simulation software CST, and a simulation result is obtained through calculation by using a time domain solver.

Specifically, in FIG. 10B, a horizontal coordinate represents a frequency in a unit of GHz, and a vertical coordinate represents magnitude values of S11, the total efficiency, and the radiation efficiency in a unit of dB. As shown in FIG. 10B, within an operating band range from 2.4 GHz to 2.5 GHz, S11 of the U-shaped slot antenna 140 in the handwriting mode of the pen nib antenna is approximately 8.5 dB higher than S11 of the antenna 140 in the free space mode of the pen nib antenna. The total efficiency of the U-shaped slot antenna 140 in the handwriting mode of the pen nib antenna is approximately 9 dB lower than the total efficiency of the antenna 140 in the free space mode of the pen nib antenna. The radiation efficiency of the U-shaped slot antenna 140 in the handwriting mode of the pen nib antenna is approximately 8.5 dB lower than the radiation efficiency of the antenna 140 in the free space mode of the pen nib antenna. S11 of the U-shaped slot antenna 140 in the air mouse mode of the pen nib antenna is approximately 6 dB lower than S11 of the antenna 140 in the free space mode of the pen nib antenna. The total efficiency of the U-shaped slot antenna 140 in the air mouse mode of the pen nib antenna is approximately 1 dB lower than the total efficiency of the antenna 140 in the free space mode of the pen nib antenna. The radiation efficiency of the U-shaped slot antenna 140 in the air mouse mode of the pen nib antenna is only approximately 1 dB lower than the radiation efficiency of the antenna 140 in the free space mode of the pen nib antenna. It can be learned that, for the U-shaped slot antenna 140 disposed close to the pen nib part 130, the total efficiency and radiation efficiency of the antenna are reduced in the handwriting mode, and antenna performance is reduced.

To resolve this problem, in some embodiments of this application, antennas are separately disposed close to the pen end part 120 and the pen nib part 130 of the pen barrel of the stylus pen 10. The antennas at the two positions may be switched by using a transmit antenna selection system (TAS). For example, when the hand of the user blocks the antenna close to the pen nib part 130, the antenna close to the pen end part 120 is in a working state, or when the hand of the user blocks the antenna close to the pen end part 120, the antenna close to the pen nib part 130 is in a working state.

In some embodiments, the pen clip antenna disclosed in the foregoing embodiment may be disposed close to the pen end part 120 of the stylus pen 10, and the slot antenna disclosed in the foregoing embodiment may be disposed close to the pen nib part 130 of the stylus pen.

In some embodiments, the slot antennas may be disposed close to both the pen end part 120 of the stylus pen 10 and the pen nib part 130 of the stylus pen, and shapes of the slot antennas may be also various curves.

Figure 9A:
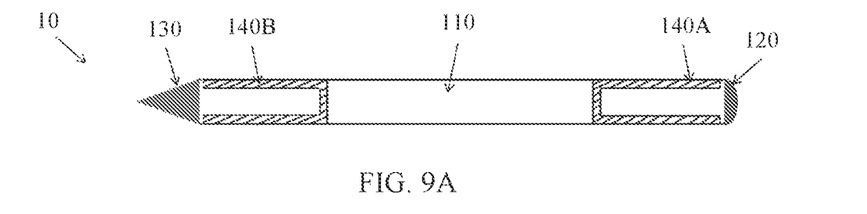
FIG. 9A to FIG. 9C separately show schematic diagrams of structures of three stylus pens with different dual slot antennas according to some embodiments of this application.
Figure 9B:
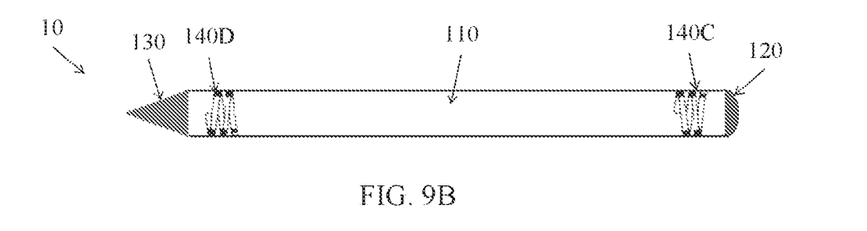
Figure 9C:
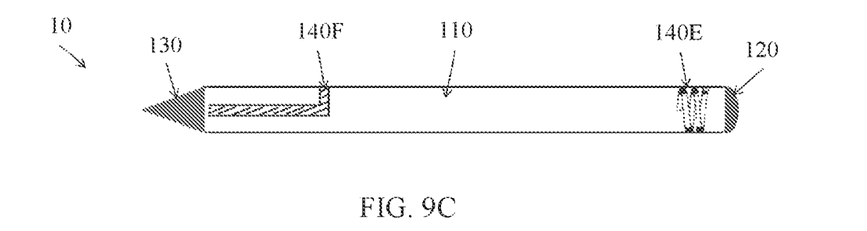

FIG. 9A to FIG. 9C separately show three stylus pens 10 with dual slot antennas. A U-shaped slot antenna 140A and a U-shaped slot antenna 140B are respectively disposed close to the pen end part 120 and the pen nib part 130 of the stylus pen 10 shown in FIG. 9A. A helical antenna 140C and a helical antenna 140D are respectively disposed close to the pen end part 120 and the pen nib part 130 of the stylus pen 10 shown in FIG. 9B.

Figure 10C:
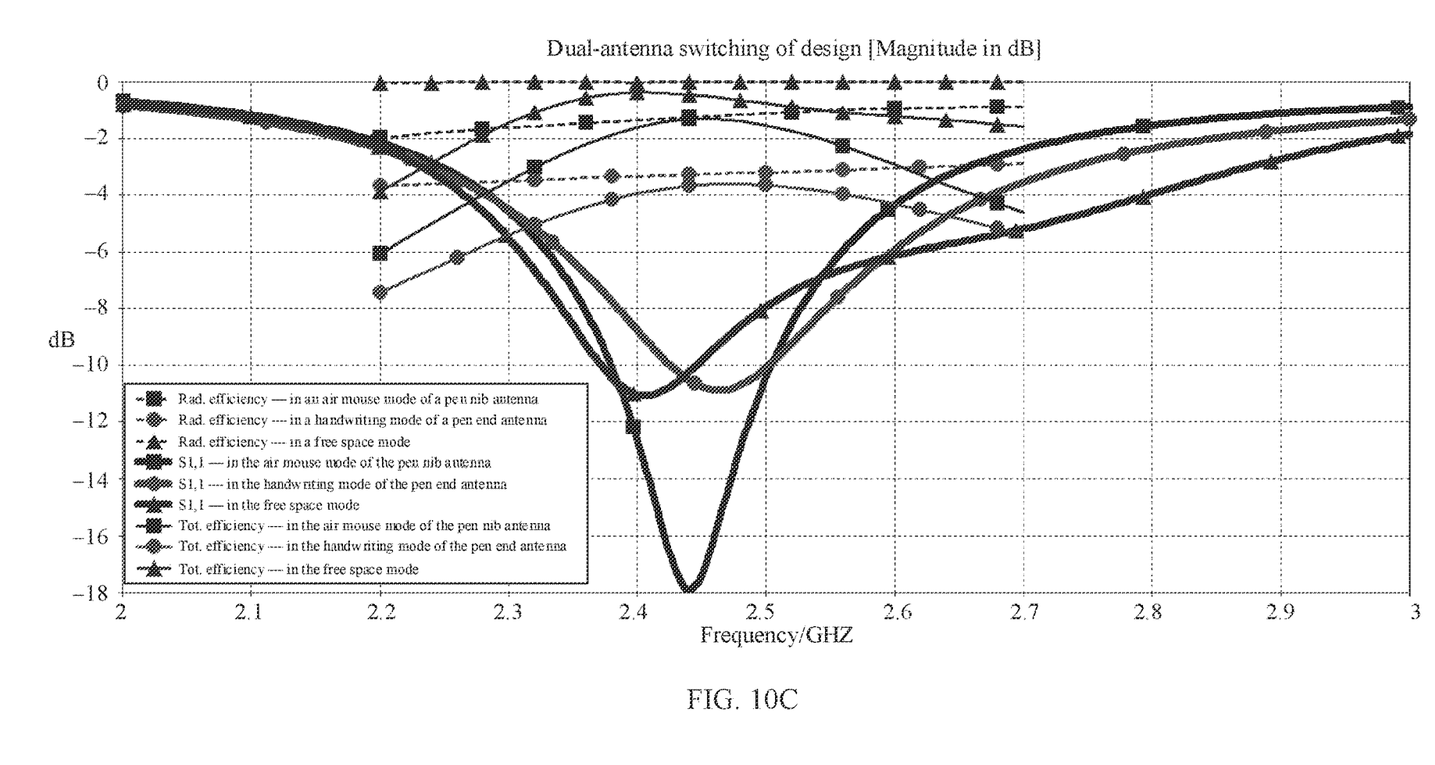
FIG. 10C is a diagram of simulation performance curves in two scenarios, namely a writing mode and an air mouse mode, according to some embodiments of this application, where U-shaped slot antennas are disposed close to both a pen end part and a pen nib part, and an antenna with better performance is selected by using a transmit antenna switching technology to work.

With reference to FIG. 10C, the following describes performance of the dual U-shaped slot antennas shown in FIG. 9A in various hand-held scenarios.

FIG. 10C is a diagram of performance simulation curves of a return loss parameter S11, total efficiency (Tot. Efficiency), and radiation efficiency (Rad. Efficiency) of the U-shaped slot antennas in a working state when the stylus pen 10 is in the handwriting mode, the air mouse mode, and a free space mode and when the U-shaped slot antenna 140A (also referred to as a pen end antenna) and the U-shaped slot antenna 140B (also referred to as a pen nib antenna) are respectively disposed close to the pen end part 120 and the pen nib part 130. The free space mode means that the stylus pen is not used. Software used in simulation is three-dimensional electromagnetic field software CST, and a simulation result is obtained through calculation by using a time domain solver.

Specifically, in FIG. 10C, a horizontal coordinate represents a frequency in a unit of GHz, and a vertical coordinate represents magnitude values of S11, the total efficiency, and the radiation efficiency in a unit of dB. As shown in FIG. 10C, within an operating band range from 2.4 GHz to 2.5 GHz, magnitude of S11 of the U-shaped slot antenna 140A in the handwriting mode is approximately the same as magnitude of S11 of the U-shaped slot antenna 140A in the free space mode. The total efficiency of the U-shaped slot antenna 140A in the handwriting mode is approximately 3.5 dB lower than the total efficiency of the U-shaped slot antenna 140A in the free space mode. The radiation efficiency of the U-shaped slot antenna 140A in the handwriting mode is approximately 3.5 dB lower than the radiation efficiency of the U-shaped slot antenna 140A in the free space mode. S11 of the U-shaped slot antenna 140B in the air mouse mode is approximately 7 dB lower than S11 of the U-shaped slot antenna 140B in the free space mode. The radiation efficiency of the U-shaped slot antenna 140B in the air mouse mode is approximately 1 dB lower than the radiation efficiency of the U-shaped slot antenna 140B in the free space mode. The total efficiency of the U-shaped slot antenna 140B in the air mouse mode is approximately 1.5 dB lower than the total efficiency of the U-shaped slot antenna 140B in the free space mode.

With reference to analysis for 12A to 12C, it can be learned that, after the dual U-shaped slot antennas are disposed on the stylus pen 10, performance of the entire antenna 140 is significantly improved by switching, in the handwriting mode, to the U-shaped slot antenna 140A close to the pen end part 120 to work and switching, in the air mouse mode, to the U-shaped slot antenna 140B close to the pen nib part 130 to work.

In the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments, and in some embodiments, these features may not be included or may be combined with other features.

It should be noted that, in the examples and specification of this patent, relational terms such as first and second are only used to distinguish one entity or operation from another entity or operation, and do not necessarily require or imply that any actual relationship or sequence exists between these entities or operations. Moreover, the terms "include", "contain", or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

Although this application has been illustrated and described with reference to some embodiments of this application, a person of ordinary skill in the art should understand that various changes may be made to this application in form and detail without departing from the scope of this application.

What is claimed is:

1. A stylus pen, comprising:
a pen barrel that extends along a longitudinal axis, wherein the pen barrel comprises:
a main body comprising a metallic tube extending along the longitudinal axis wherein a part of the metallic tube has an opening, and wherein the opening is filled with plastic or a glass fiber;
a pen nib part disposed at a first end of the main body; and
a pen end part that is disposed at a second end of the main body and that corresponds to the pen nib part; and
an antenna disposed on the main body and comprising:
a first portion perpendicular to the main body; and
a second portion extending along a longitudinal direction of the main body with the opening corresponding to and extending along a length of the second portion,
wherein at least one part of the antenna is located outside the pen barrel and is in proximity to the pen nib part or the pen end part, and
wherein the antenna comprises a loop antenna in proximity to the pen end part.

2. The stylus pen of claim 1, wherein the antenna further comprises a metallic pen clip in proximity to the pen end part.

3. The stylus pen of claim 2, wherein a part of the metallic pen clip is located outside the pen barrel and coated with a plastic layer.

4. The stylus pen of claim 1, wherein the antenna further comprises a slot antenna disposed on the metallic tube.

5. The stylus pen of claim 1, wherein the antenna is a Bluetooth antenna.

6. A stylus pen, comprising:
a pen barrel comprising:
  a main body comprising a metallic tube extending along a longitudinal axis, wherein a part of the metallic tube has an opening, and wherein the opening is filled with plastic or a glass fiber;
  a pen nib part disposed at a first end of the main body; and
  a pen end part that is disposed at a second end of the main body and that corresponds to the pen nib part; and
an antenna comprising:
  at least one slot antenna disposed on the metallic tube, wherein the at least one slot antenna comprises:
    a first slot antenna in proximity to the pen nib part; and
    a second slot antenna in proximity to the pen end part, wherein the first slot antenna and the second slot antenna are configured to be switched based on a working state of the stylus pen.

7. The stylus of claim 6, wherein the at least one slot antenna is in proximity to the pen nib part or the pen end part.

8. The stylus pen of claim 6, wherein the first slot antenna and the second slot antenna are configured to be switched using a transmit antenna selection technology.

9. The stylus pen of claim 6, wherein the at least one slot antenna is a Bluetooth antenna, and wherein the at least one slot antenna has a slot length between 40% to 60% of a wavelength of a Bluetooth signal transmitted by the at least one slot antenna.

10. The stylus pen of claim 9, wherein the at least one slot antenna is U-shaped.

11. The stylus pen of claim 9, wherein the at least one slot antenna is Z-shaped.

12. The stylus pen of claim 9, wherein the at least one slot antenna is curved shaped.

13. The stylus pen of claim 12, wherein the at least one slot antenna is helical shaped.

14. The stylus pen of claim 6, wherein the main body further comprises a plastic tube extending along the longitudinal axis, and wherein the plastic tube sleeves the metallic tube.

15. A stylus pen, comprising:
a pen barrel that extends along a longitudinal axis, wherein the pen barrel comprises:
  a main body comprising a metallic tube extending along the longitudinal axis, wherein a part of the metallic tube has an opening, and wherein the opening is filled with plastic or a glass fiber;
  a pen nib part disposed at a first end of the main body; and
  a pen end part disposed at a second end of the main body and that corresponds to the pen nib part; and
an antenna disposed on the main body and comprising:
  a first portion perpendicular to the main body; and
  a second portion extending along a longitudinal direction of the main body with the opening corresponding to and extending along a length of the second portion,
wherein at least one part of the antenna is located outside the pen barrel and is in proximity to the pen nib part or the pen end part, and
wherein the antenna comprises a planar inverted-F antenna in proximity to the pen end part.

16. The stylus pen of claim 15, wherein the antenna is a Bluetooth antenna.

17. The stylus pen of claim 15, wherein the antenna further comprises a metallic pen clip in proximity to the pen end part.

18. The stylus pen of claim 17, wherein a part of the metallic pen clip is located outside the pen barrel and coated with a plastic layer.

19. The stylus pen of claim 15, wherein the antenna further comprises a slot antenna disposed on the metallic tube.

20. The stylus pen of claim 19, wherein the slot antenna is helical shaped.

* * * * *